United States Patent Office 3,125,529
Patented Mar. 17, 1964

3,125,529
MIXED ARYL PHOSPHATE ESTERS HAVING UNUSUAL KINEMATIC VISCOSITIES
Daniel Filmore Simmons and Henry Vedder Wainright, Point Pleasant, W. Va., assignors to Celanese Corporation of America, New York, N.Y., a corporation of Delaware
No Drawing. Filed Feb. 19, 1960, Ser. No. 9,706
10 Claims. (Cl. 252—49.8)

This invention relates to improved aryl phosphates.

Various aryl phosphates have found use as functional fluids, e.g. in lubricating and hydraulic fluid compositions, because of their desirable properties such as of non-inflammability, non-volatility, and resistance to oxidation. It has been found, however, that it is often difficult to obtain esters of this type having the high viscosities, e.g. from 300 to 650 SUS at 100° F., required for some applications. Thus, in order to obtain compositions having relatively high viscosities, it has been necessary to blend the aryl phosphate with various additives. However, the addition of additives may adversely affect certain properties of the ester other than viscosity, e.g. its fire-resistance and lubricating properties. Moreover, modification of the composition with additives is often expensive to carry out because of the high cost of the additives and the extra blending facilities and labor costs necessitated by such modification.

It is an object of this invention to provide improved aryl phosphates having relatively high viscosities. It is a further object of this invention to provide high viscosity aryl phosphates having good lubricating and fire-resistance properties which are capable of being produced more economically than heretofore. Other objects will be apparent from the following detailed description and claims.

In accordance with one aspect of the invention, an aryl phosphate is prepared by reacting an ester-forming derivative of phosphoric acid with a phenolic mixture, e.g. a cresylic acid, containing at least 40% by weight of 2,4-dimethyl phenol, 2,5-dimethyl phenol or 3,4-dimethyl phenol or mixtures thereof, and wherein said latter phenols are present in an amount at least 40% by weight of the phenolic mixture greater than any meta and para cresols which may be present. It has been found that these esters are generally liquids at room temperature and have a kinematic viscosity of at least 300 and up to 650 or more SUS at 100° F.

The 2,4-, 2,5-, 3,4-dimethyl phenols, and more particularly the two component combination of the 2,4- and 2,5-dimethyl phenols, are preferably present in an amount above 50% by weight and most suitably above 70% by weight, and the meta and para cresols are preferably present in an amount below 13% and most suitably below 5% by weight of the phenolic mixture, to obtain esters having a particularly high viscosity, e.g. above 550 SUS at 100° F.

In addition to the dimethyl phenols and cresols referred to above, the phenolic mixture used in the esterification may also contain varying amounts of phenol, orthocresol, 2-, 3-, and 4-ethyl phenols, 2,3-, 3,5- and 2,6-dimethyl phenols, 2,4,6- and 2,3,6-trimethyl phenols and other 9 carbon phenols. In general, the phenolic mixture will contain at least 80%, preferably at least 98%, by weight of monocyclic phenols, and at least 80% by weight of phenols haivng no more than 8 carbon atoms.

In preparing the phosphate esters of this invention, a mixture containing the desired proportions of 2,4-, 2,5- and 3,4-dimethyl phenols and of meta- and para-cresols, are reacted with phosphoric acid or an ester-forming phosphoric acid derivative, e.g. a phosphoryl halide such as phosphorus oxychloride or phosphorus pentachloride or phosphorus pentoxide.

Generally there is employed a 5–8% weight excess of the phenol mixture described above that required to react with the ester-forming phosphoric acid derivative. The reaction mixture is slowly heated to a maximum temperature of about 195° C. in the presence of a small amount of metal halide catalyst such as aluminum chloride, magnesium chloride, etc. over a period of 6–10 hours. When the reaction is carried out with phosphorus oxychloride, hydrogen chloride is evolved. The by-product gas may be absorbed in water in a suitable contacting chamber and may either be built up to commercial hydrochloric acid strength or discarded as a dilute solution. The phosphate ester may be recovered from the reaction mixture by contacting or extracting the crude product with weak aqueous alkali to remove acidity and excess phenols, followed by treatment with an oxidizing agent to remove the last traces of oxidizable impurities. Alternatively, the phosphate ester may be recovered by distilling the crude product at reduced pressures to separate a main portion which is again contacted or extracted with weak aqueous alkali and treated with an oxidizing agent.

The following examples are given to illustrate this invention further. Percentages are by weight unless otherwise indicated.

*Example I*

500 parts by weight of a phenolic mixture containing 89.6% of 2,4 and 2,5-dimethyl phenols, 3.8% of meta and para cresols and 6.4% of mixed xylenols (composed of meta and para ethyl phenols, 3,5- and 2,3-dimethyl phenols and 2,3,6- and 2,4,6-trimethyl phenols) as determined by vapor phase chromatography, were mixed with 200 parts by weight of phosphorus oxychloride in a retort equipped with reflux condenser and an agitator. This weight of phosphorus oxychloride had been determined as the necessary amount to react with all OH compounds present allowing for about a 5–8% excess of reactable OH compounds. 4 parts by weight of anhydrous magnesium chloride catalyst was added and heat applied to cause the reaction to take place. Evolution of hydrogen chloride began at approximately 85° C. The temperature was raised to 195° C. over a period of 6–8 hours maintaining a careful control of the temperature to allow a steady evolution of gas but not so violent as to cause excessive phosphorus oxychloride entrainment loss through the reflux condenser. When reaction was complete as evidenced by cessation of gas flow and titration tests on the crude product, the crude mix was removed to a vacuum still and distilled at about 10 mm. pressure taking cuts as follows:

(1) A forerun cut boiling approximately 90 to 150° C. containing mainly the excess phenols.
(2) An intermediate cut boiling approximately 150–260° C. containing some intermediate material and the relatively higher colored end of the ester cut.
(3) A main ester portion boiling about 260–320° C. representing about 90% of the crude charge which was the portion finished as product.

The main portion was washed with five batchwise 1½% sodium hydroxide washes of equal volume at about 80° C. to remove phenols carried over in distillation. This was followed by sufficient water washing to remove all free sodium hydroxide. The washed oil was then treated for 20–30 minutes with 0.35% by weight of potassium permanganate at 80–90° C. using about an equal volume of water. The excess potassium permanganate was decolorized with sodium bisulfite or oxalic acid. The oil was then water-washed, dehydrated under vacuum and filtered with adsorptive clay to give the finished product.

The product obtained was a clear, oily liquid having essentially no odor. It had a kinematic viscosity of 591.4 SUS at 100° F., a specific gravity of 1.147 at 20/20° C., a flash point of 490° F. (ASTM D-92-46), a fire point of 675° F. (ASTM D-92-46), a pour point of 20° F. (ASTM D-97-47), a color of 250 APHA (ASTM D-1209-54), an auto-ignition temperature of 1120° F. (ASTM D-286-30), and an acid number of 0.04. The product was suitable as a high viscosity hydraulic fluid or lubricant.

*Example II*

The procedure of Example I was repeated except that the phenolic mixture was a cresylic acid containing 29.4% of 2,4 and 2,5-dimethyl phenols, 15.9% of 3,4-dimethyl phenol, 3.2% of meta and para cresols, 23.0% of mixed xylenols (as described in Example I) and 28.3% of trimethyl phenols not present in the mixed xylenol fraction. The resulting ester was a clear, oily liquid having a viscosity at 100° F. of 410 SUS, a flash point of 465° F., a fire point of 675° F., a pour point of 0° F. and an autoignition temperature of 1185° F. The ester was suitable as a high viscosity hydraulic fluid and lubricant.

*Example III*

The procedure of Example I was repeated except that the phenolic mixture contained 47.9% of 2,4-, 2,5-dimethyl phenols, 2.5% of 3,4-dimethyl phenol, 43.2% of mixed xylenols (defined as in Example I), 5.0% of meta and para cresols, 0.5% of trimethyl phenols not in the mixed xylenol fraction, 0.1% phenol, 0.1% orthocresol, and 0.1% of 2,6-dimethyl phenol. The resulting ester was a clear, oily liquid having a viscosity at 100° F. of 319.8 SUS, a flash point of 465° F., a fire point of 675° F., a pour point of 5° F. and an autoignition temperature of 1185° F. It was suitable as a high viscosity hydraulic fluid and lubricant.

The esters of this invention may have incorporated therewith minor amounts of the usual additives such as rust inhibitors or agents for improving their viscosity index where desired.

The esters of this invention are highly stable to hydrolysis and show substantially no tendency to ignite or burn even when subjected to extremely high temperatures in the presence of air. In addition, they are extremely effective lubricants.

Because of their superior properties, the phosphate esters of this invention are suitable for a wide variety of uses. They are excellent for use as the working fluid in hydraulic systems, particularly where there is the danger of fire occurring in the event of a leak or a break in the systems. These phosphate esters also possess outstanding lubricative properties so that they may be used to lubricate parts where ordinary lubricant materials, such as mineral oils, are unsuitable owing to their flammability, volatility, susceptibility to oxidation, or the like. The lubricative properties of the phosphate esters of this invention also enhance their suitability for use in hydraulic systems since they will lubricate all the parts with which they come into contact and prevent excessive wear of the same. Other non-flammable fluids, such as water, that have been suggested for use in hydraulic systems do not act as effective lubricants so that when they are employed in such systems, excessive wear of the moving parts therein frequently occurs. Because of their outstanding properties, the phosphate esters are particularly suitable for use in hydraulic systems where the operating conditions are severe and in high pressure systems employing pumps with anti-friction bearings. They may also be used to lubricate air compressors where they reduce the hazard of explosions and fires, while affording proper lubrication to the equipment.

Not only are the phosphate esters of this invention well suited for use in hydraulic systems and as lubricants, they are also effective plasticizers of various thermoplastic materials including, for example, the cellulosic plastics and polyvinyl chloride. Among the cellulosic plastics for which these phosphate esters may serve as plasticizers, there may be listed cellulose esters, such as cellulose acetate, cellulose propionate, cellulose acetate propionate and cellulose acetate butyrate, and cellulose ethers such as ethyl cellulose. When incorporated into thermoplastic compositions, the phosphate esters of this invention may be used as the sole plasticizers or they may be combined with other plasticizers. The quantity of the phosphate ester required will depend upon the nature of the thermoplastic material and the desired properties. In plasticizing polyvinyl chloride the proportion of the phosphate esters, when used alone, will normally range between about 30 and 70% by weight on the weight of the polyvinyl chloride.

It is to be understood that the foregoing detailed description is given merely by way of illustration and that many variations may be made therein without departing from the spirit of our invention.

Having described our invention what we desire to secure by Letters Patent is:

1. A phosphate ester of a phenolic mixture comprising a member of the group consisting of 2,4-dimethyl phenol, 2,5-dimethyl phenol, 3,4-dimethyl phenol and mixtures thereof, the amount of said dimethyl phenols being at least 40% by weight of the phenolic mixture greater than any meta and para cresols present in said phenolic mixture and having at least 90% by weight of monocyclic phenols, said ester having a kinematic viscosity of at least 300 SUS at 100° F.

2. Phosphate esters of a phenol mixture comprising at least 40% by weight of a member of the group consisting of 2,4-dimethyl phenol, 2,5-dimethyl phenol, 3,4-dimethyl phenol and mixtures thereof, the amount of said latter dimethyl phenols being at least 40% by weight of the phenolic mixture greater than any meta and para cresols present in said phenolic mixture.

3. The ester of claim 2 having a kinematic viscosity of at least 300 SUS at 100° F.

4. The ester of claim 3 wherein said phenolic mixture comprises at least 90% by weight of monocyclic phenols.

5. The ester of claim 4 wherein said phenolic mixture comprises at least 80% by weight of phenols having no more than eight carbon atoms.

6. The ester of claim 3 wherein said phenolic mixture comprises at least 50% by weight of 2,4- and 2,5-dimethyl phenols.

7. The ester of claim 3 wherein meta and para cresols are present in said phenolic mixture in an amount no greater than 5% by weight of said phenolic mixture.

8. An hydraulic composition having as the working fluid thereof the ester claimed in claim 3 having a kinematic viscosity of about 300 to 650 SUS at 100° F.

9. Polyvinyl chloride having admixed therewith, as a plasticizer, about 30 to 70% of the phosphate ester claimed in claim 3.

10. A method of lubricating which comprises providing between the surfaces to be lubricated a lubricant having as the lubricating substituent thereof the phosphate ester claimed in claim 3.

References Cited in the file of this patent

UNITED STATES PATENTS

| | | |
|---|---|---|
| 1,425,393 | Laska et al. | Aug. 8, 1922 |
| 2,078,421 | Shuman | Aug. 27, 1937 |
| 2,561,493 | Caprio et al. | July 24, 1951 |
| 2,805,240 | Prahl | Sept. 3, 1957 |
| 2,868,827 | O'Connor et al. | Jan. 13, 1959 |
| 2,995,519 | Shatynski et al. | Aug. 8, 1961 |
| 3,012,057 | Fierce et al. | Dec. 5, 1961 |
| 3,022,331 | Bondy et al. | Feb. 20, 1962 |

FOREIGN PATENTS

| | | |
|---|---|---|
| 495,618 | Canada | Aug. 25, 1953 |